United States Patent
Finch et al.

(10) Patent No.: US 9,879,138 B2
(45) Date of Patent: *Jan. 30, 2018

(54) DURABLE THERMOSETS FROM REDUCING SUGARS AND PRIMARY POLYAMINES

(75) Inventors: William Finch, Ambler, PA (US); Haksu Lee, Ambler, PA (US); Charles J. Rand, Philadelphia, PA (US); Robert L. Sammler, Midland, MI (US); Frances J. Timmers, Midland, MI (US); Barry Weinstein, Dresher, PA (US)

(73) Assignees: Dow Global Technologies LLC, Midland, MI (US); Rohm and Haas Company, Collegeville, PA (US)

(*) Notice: Subject to any disclaimer, the term of this patent is extended or adjusted under 35 U.S.C. 154(b) by 1599 days.

This patent is subject to a terminal disclaimer.

(21) Appl. No.: 13/091,309

(22) Filed: Apr. 21, 2011

(65) Prior Publication Data

US 2011/0262648 A1   Oct. 27, 2011

Related U.S. Application Data

(60) Provisional application No. 61/326,777, filed on Apr. 22, 2010, provisional application No. 61/333,023, filed on May 10, 2010.

(51) Int. Cl.
| | | |
|---|---|---|
| C08L 5/00 | (2006.01) | |
| C08L 79/02 | (2006.01) | |
| C09J 179/02 | (2006.01) | |

(52) U.S. Cl.
CPC ............. *C08L 79/02* (2013.01); *C09J 179/02* (2013.01)

(58) Field of Classification Search
CPC ...... C08L 79/02; C08L 2666/26; C09J 179/02
USPC ...................................................... 427/304
See application file for complete search history.

(56) References Cited

U.S. PATENT DOCUMENTS

| | | | |
|---|---|---|---|
| 2,215,825 | A | 9/1940 | Wallace et al. |
| 3,274,012 | A | 9/1966 | Cooper et al. |
| 3,513,001 | A | 5/1970 | Worthington et al. |
| 4,107,379 | A | 8/1978 | Stofko |
| 4,183,997 | A | 1/1980 | Stofko |
| 4,524,164 | A | 6/1985 | Viswanathan et al. |
| 5,371,194 | A | 12/1994 | Ferretti |
| 5,895,804 | A | 4/1999 | Lee et al. |
| 5,905,115 | A | 5/1999 | Luitjes et al. |
| 6,299,936 | B1 | 10/2001 | Reck et al. |
| 6,753,361 | B2 | 6/2004 | Kroner et al. |
| 7,195,792 | B2 | 3/2007 | Boston et al. |
| 7,470,520 | B1 | 12/2008 | Elashvili |
| 7,494,566 | B2 | 2/2009 | Carroll et al. |
| 7,579,289 | B2 | 8/2009 | Clamen et al. |
| 7,655,711 | B2 | 2/2010 | Swift et al. |
| 7,766,975 | B2 | 8/2010 | Clamen et al. |
| 7,893,154 | B2 | 2/2011 | Van Herwijnen et al. |
| 2005/0130261 | A1 | 6/2005 | Wils et al. |
| 2006/0204589 | A1 | 9/2006 | Nelson et al. |
| 2006/0239889 | A1 | 10/2006 | Lewis et al. |
| 2007/0123679 | A1 | 5/2007 | Swift et al. |
| 2007/0123680 | A1 | 5/2007 | Swift et al. |
| 2008/0191179 | A1 | 8/2008 | Bernard et al. |
| 2009/0324915 | A1 | 12/2009 | Swift et al. |
| 2010/0087571 | A1 | 4/2010 | Jackson et al. |
| 2010/0222459 | A1* | 9/2010 | Kelly et al. ............... 524/17 |
| 2010/0282996 | A1 | 11/2010 | Jaffrennou et al. |
| 2011/0039111 | A1 | 2/2011 | Shooshtari |
| 2011/0040010 | A1 | 2/2011 | Shooshtari |
| 2011/0210280 | A1 | 9/2011 | Jaffrennou |

FOREIGN PATENT DOCUMENTS

| | | |
|---|---|---|
| DE | 1905054 | 8/1969 |
| EP | 0020004 A1 | 12/1980 |
| EP | 0044614 A2 | 1/1982 |
| GB | 2078805 A | 1/1982 |
| JP | 49071121 A | 7/1974 |
| JP | 2005239706 A | 9/2005 |
| WO | 2007014236 A2 | 2/2007 |
| WO | 2008091256 A1 | 7/2008 |
| WO | 2009004261 A2 | 1/2009 |
| WO | 2009006532 A1 | 1/2009 |
| WO | 2009019232 A1 | 2/2009 |
| WO | 2009019235 A1 | 2/2009 |
| WO | 2009149334 A2 | 12/2009 |
| WO | 2010/106181 A1 | 9/2010 |
| WO | 2011019597 A1 | 2/2011 |
| WO | 2011019598 A1 | 2/2011 |
| WO | 2011044490 A1 | 4/2011 |

OTHER PUBLICATIONS

Micheel et al., "D-Glucose Derivatives of Proteins," Chemical Abstracts, vol. 51, No. 4, Feb. 1, 1957, pp. 1-2.
Potman, R. P., et al., "Mechanistic studies of the Maillard reaction with emphasis on phosphate-mediated catalysis," In thermal generation of aromas; Chapter 17; Parliment, T., et al., ACS Symposium Series, American Chemical Society: Washington, DC, 1989, pp. 182-195.
"Melanoidin," at http://en.wikipedia,org/wiki/Melanoidin.
U.S. Appl. No. 12/660,380, filed Feb. 25, 2010, for "Rapid Cure Carbohydrate Composition" to Jean Marie Brady et al.
U.S. Appl. No. 12/660,373, filed Feb. 25, 2010, for Polymer Modified Carbohydrate Curable Binder Composition to Michael Kelly et al.
U.S. Appl. No. 13/091,268, filed Apr. 21, 2011, for "Durable Thermoset Binder Compositions From 5-Carbon Reducing Sugars and Use as Wood Binders" to Charles J. Rand et al.

* cited by examiner

*Primary Examiner* — Robert S Walters, Jr.
(74) *Attorney, Agent, or Firm* — Andrew Edwin Cox Merriam

(57) ABSTRACT

The present invention provides thermosetting aqueous binder compositions of one or more diprimary diamine, e.g. lysine, or poly(primary amine), e.g. polyethylenimine, and one or more reducing sugar in which the number of equivalents of primary amine relative to the number of equivalents of carbonyl groups in the reducing sugar ranges from 0.4:1 to 2:1, the binders being suitable for use on fiber, nonwoven, woven web and finely divided substrates. The binders are at least substantially formaldehyde free, need no polycarboxylic or polycarboxylate component, and yet provide excellent hot wet tensile strength when cured for as little time as a minute or less in use.

1 Claim, No Drawings

US 9,879,138 B2

DURABLE THERMOSETS FROM REDUCING SUGARS AND PRIMARY POLYAMINES

This application claims the benefit of priority under 35 U.S.C.§ 119(e) of U.S. Provisional Patent Application Nos. 61/326,777 filed on Apr. 22, 2010 and 61/333,025 filed May 10, 2010.

The present invention relates to aqueous binder compositions comprising one or more reducing sugar and one or more diprimary diamine or poly(primary amine), and uses thereof as curable binders for a variety of finely divided substrate materials, as well as wovens and non-wovens, and the cured binder treated products made therefrom.

Due to their favorable cost/performance, the thermosetting binder resins of choice in the past have been phenol/formaldehyde or urea/formaldehyde resins. Applications for formaldehyde resins are extensive, particularly in mineral and glass fiber binding. In insulation products, cured mineral fiber binders allow the insulation to be compressed while retaining the rigidity that allows the compressed insulation to recover substantially to its original shape once compressive forces are removed. This allows, for example, the insulation to be shipped in a rolled, compressed state and unrolled before installation to release the compression, and allow a fluffy, heat-insulating mat to be installed. Existing commercial formaldehyde-free binders most commonly contain a polycarboxylic acid polymer and a polyol that esterify and form a thermoset when heat cured. However, these binders are known to be derived primarily from petroleum feed stocks which are dwindling and experiencing wide price fluctuations and that contribute to atmospheric carbon dioxide. Further, formaldehyde is recognized as highly toxic and has been classified as a human carcinogen by several health authorities; and environmental, health and safety (EHS) initiatives as well as new regulations are demanding formaldehyde free binders for composites in fibrous building materials such as, stonewool, glasswool, composite and cellulose fibers.

Recent formaldehyde free binders have been made from sustainable materials that are not derived from petroleum feed. U.S. Patent Publication no. 2007/0123679, 2007/0123680 to Swift et al discloses formaldehyde free binder compositions that form melanoidins from the condensation of proteins or amino acids with reducing sugars as thermosets. See also http://en.wikipedia.org/wiki/Melanoidin. However, the compositions when used as binders cure only in very harsh conditions and provide cured products with inadequate tensile strength and water resistance. Also, such binders tend to be stiff and unsuitable for flexible substrates and cure too slowly for practical application.

The present inventors have sought to provide a formaldehyde free binder to solve the problem of providing renewable source thermosetting binders that meet the need for a more durable, water resistant formaldehyde-free, thermoset binder that develops strength early in the curing process.

STATEMENT OF THE INVENTION

According to the present invention, aqueous binders compositions comprise diprimary diamines, such as lysine, poly (primary amines), such as polyamines having a weight average molecular weight of 5,000 or less, preferably 3,800 or less, or, more preferably, 2,500 or less, e.g. polyethyleneimines, and reducing sugars chosen from reducing mono- and di-saccharides, their natural or synthetic stereoisomers or optical isomers, hydroxy, halo, alkyl, alkoxy or carbonyl substituted reducing mono and di-saccharides, and dehydrated forms of reducing mono and di-saccharides. Preferably, the aqueous binder compositions are substantially free of strong acids and are substantially free of polycarboxylic acids.

In one embodiment, the diprimary diamines or poly (primary amine)s have an amine equivalent weight of 400 or less, preferably 200 or less.

In another embodiment, diprimary diamines are chosen from aminoguanidine and diprimary diamines having a ratio of primary amine groups to secondary amine groups of more than 2.01:1.

In yet another embodiment, the poly(primary amine)s comprise polymers having 10 wt. % or more, or, preferably, 20 wt. % or more, of primary amine groups, such as ethylamines.

The reducing mono- and di-saccharides in one embodiment have a formula weight of 500 or less atomic mass units.

The number of equivalents of primary amine relative to the number of equivalents of carbonyl (as aldehyde or ketone) groups in the reducing sugar should range from 0.4:1 or higher and up to 2:1, preferably 0.6:1 or higher, or, preferably, 0.8:1 or higher, or 1.0:1 or higher. A 2:1 equivalent ratio of primary amine to carbonyl in the reducing sugar equates to 50 mole % of di-primary diamine per one mole of a reducing sugar having one carbonyl group, e.g. dextrose.

The present invention provides aqueous binder compositions which further comprise one or more capping agent, such as a titanate, zirconate or aluminate, for example titanium lactate. Such capping agents may be used in the amount of from 1.0 to 5 wt. %, based on the total binder solids.

In one embodiment, the aqueous binder compositions further comprise a vinyl emulsion or dispersion polymer having up to 10 wt. %, based on the total weight of copolymerized monomers, of copolymerized carboxyl group containing monomers. Such a polymer may be a (meth)acrylate copolymer comprising greater than 30 wt. %, based on the total weight of copolymerized monomers, of a copolymerized $C_2$ or higher alkyl (meth)acrylate, or a (meth) acrylate copolymer having up to 5 wt. %, or, preferably, up to 3 wt. %, based on the total weight of copolymerized monomers of copolymerized carboxyl group containing monomers, such as methacrylic acid.

In another embodiment, the aqueous binder compositions may further comprise 1 wt. % or more, or, preferably up to 5 wt. %, based on the total binder solids, of an organosilane.

In yet another embodiment, the aqueous binder compositions may further comprise one or more reactive water proofing agent chosen from a $C_5$ to $C_{30}$ alk(en)yl 2-hydroxyethyl alk(en)amide, $C_5$ to $C_{30}$ alk(en)yl bis(2-hydroxyethyl) amide, $C_{11}$ to $C_{30}$ alk(en)yl 2-hydroxyethyl (alk(en))amine, $C_{11}$ to $C_{30}$ alk(en)yl bis(2-hydroxy-ethyl) amine, $C_{11}$ to $C_{30}$ alk(en)yl tris(2-hydroxyethyl) amine, $C_5$ to $C_{30}$ alk(en)yl monoglyceride, $C_5$ to $C_{30}$ alk(en)yl monocarboxylate of a trihydric polyol, (poly)alkoxylated amines and (poly) alkoxylated alk(en)yl monocarboxylates. Such reactive waterproofing agents may be used in amounts of up to 10 wt. %, based on the total binder solids.

In still another embodiment, the aqueous binder compositions may further comprise a phosphorous-containing accelerator or an esterification catalyst, such as an alkali metal hypophosphite, and alkali metal hydrogen phosphonate, mono and di alkali metal phosphonates, alkylphosphonic and arylphosphonic or phosphinic acids including their alkali metal salts. Suitable catalysts may be used in amounts of 0.1 wt. % or more, or up to 30 wt. %, based on the total binder solids, preferably, 4.0 wt. % or more or up to 20 wt. %.

In addition, the present invention provides methods of treating substrates with the aqueous binder compositions, followed by drying and heat curing.

Further, the present invention provides articles comprising substrates treated according to the methods of the present invention.

As used herein, the phrase "alkyl" means any aliphatic alkyl group having one or more carbon atoms, the alkyl group including n-alkyl, s-alkyl, i-alkyl, t-alkyl groups or cyclic aliphatics containing one or more 5, 6 or seven member ring structures.

As used herein, the phrase "aqueous" or includes water and mixtures composed substantially of water and water-miscible solvents.

As used herein, the phrase "emulsion polymer" refers to a polymer that when combined with water or aqueous solvent forms a disperse phase of an aqueous emulsion.

As used herein, the phrase "substantially formaldehyde-free" refers to compositions free from added formaldehyde, and which do not liberate substantial formaldehyde as a result of drying and/or curing. Preferably, such binder or material that incorporates the binder liberates less than 100 ppm of formaldehyde, more preferably less than 25 and most preferably less than 5 ppm of formaldehyde, as a result of drying and/or curing the binder.

As used herein, the term "poly(primary amine)" means any compound having three or more primary amine groups.

As used herein, the term "polymer" includes the term "copolymer", and, unless otherwise indicated, the term "copolymer" refers to polymers made from any two or more different monomers, including, for example, terpolymers, pentapolymers, homopolymers functionalized after polymerization so that two or more different functional groups are present in the product copolymer, block copolymers, segmented copolymers, graft copolymers, and any mixture or combination thereof. (Co)polymer means homopolymer or copolymer.

As used herein the term "substantially free of strong acids" means that a composition contains less than 500 ppm of such acids, based on the total binder solids.

As used herein, the term "substantially free of polycarboxylic acids" means that a composition contains less than 1.0 wt. % based on the total binder solids of polycarboxylic acids, including polyprotic polycarboxylic acids, e.g. citric acid, and polymeric polycarboxylic acids, e.g. acrylic or vinyl solution polymers having more than 10 wt. % of copolymerized carboxyl group containing monomers. As used herein, the term "polycarboxylic acids" excludes emulsion polymers having 10 wt. % or less of copolymerized carboxyl group containing monomers.

As used herein, unless otherwise indicated, the term "weight average molecular weight" refers to the molecular weight of a substance as determined by size exclusion gel chromatography (SEC).

As used herein, "wt. %" or "wt. percent" means weight percent based on solids.

As used herein, the phrase "based on the total binder solids" refers to weight amounts of any given ingredient in comparison to the total weight amount of all of the non-volatile ingredients in the binder (e.g., saccharide(s), primary amines, capping agents, silanes, emulsion copolymer(s), reactive water proofing agents, and the like).

The singular forms "a," "an," and "the" include plural referents unless the context clearly dictates otherwise.

Unless defined otherwise, technical and scientific terms used herein have the same meaning as is commonly understood by one skilled in the art.

Unless otherwise indicated, any term containing parentheses refers, alternatively, to the whole term as if no parentheses were present and the term without that contained in the parentheses, and combinations of each alternative. Thus, the term "(meth)acylate" encompasses, in the alternative, methacrylate, or acrylate, or mixtures thereof.

The endpoints of all ranges directed to the same component or property are inclusive of the endpoint and independently combinable. Thus, for example, a disclosed range of a ratio of from 0.4:1 or higher and up to 2:1, preferably 0.6:1 or higher, or, preferably, 0.8:1 or higher means any and all of from 0.4:1 to 2:1, from 0.4:1 to 0.6:1, from 0.6:1 to 2:1, from 0.6:1 to 0.8:1, from 0.4:1 to 0.8:1, and from 0.8:1 to 2:1.

Unless otherwise indicated, conditions of temperature and pressure are room temperature and standard pressure, also referred to as "ambient conditions". The aqueous binder compositions may be dried under conditions other than ambient conditions.

The aqueous binder composition of the present invention comprises largely renewable materials from natural sources, such as vegetable feedstocks. The hot wet tensile strength and, thus durability of binder treated products is improved through the use of the aqueous binder compositions of the present invention. In addition, as shown by the rapid development of physical properties during cure, the aqueous binder compositions exhibit a lower cure energy when compared to binders from other natural or renewable feedstocks.

For each aqueous binder composition described herein, there exists an accompanying embodiment in which the aqueous composition is a binder composition and in which the composition is present in a composite material or product. As defined herein, the term "composite material" refers to materials comprising: (a) a substrate material selected from fibers, slivers, chips, particles, films, sheets, and combinations thereof; and (b) the binder composition of the described embodiment.

The present invention provides aqueous binder compositions comprising a total solids of from 5 to 95 wt. %, preferably, 4 wt. % or more or, preferably, 50 wt. % or less, or, more preferably, 60 to 70 wt. %, based on the total weight of the aqueous binder. The aqueous binders also include powdered binders which can be derived from drying any of the aqueous binder solutions.

The aqueous binder composition of the present invention comprises at least one reducing sugar, which a monosaccharide or di-saccharide. A reducing sugar herein is any sugar that has an aldehyde or a ketone in its open chain form. This allows the sugar to act as a reducing agent, for example in a reaction with an amine. A sugar may be a reducing sugar when its anomeric carbon (the carbon linked to two oxygen atoms) is in the free form. Sugars may occur in a chain as well as a ring structure and it is possible to have an equilibrium between these two forms. Further, some keto sugars are reducing sugars because they may be converted to an aldehyde via a series of tautomeric shifts to migrate the carbonyl to the end of the chain. This pathway could become accessible during the thermal curing process.

Reducing sugars include all monsaccharides, whether aldose (containing an aldehyde) or ketose (containing a ketone). Reducing sugars include glucose, fructose, glyceraldehydes, lactose, arabinose and maltose. Accordingly, the reducing sugar component of the present invention may be a monosaccharide in its aldose or ketose form, including a triose, a tetrose, a pentose, a hexose, or a heptose. Glyceraldehyde and dihydroxyacetone are considered to be aldose and ketose sugars, respectively. Examples of aldotetrose sugars include erythrose and threose; and ketotetrose sugars include erythrulose. Aldopentose sugars include ribose, arabinose, xylose, and lyxose; and ketopentose sugars include ribulose, arabulose, xylulose, and lyxulose. Examples of aldohexose sugars include glucose (for example, dextrose), mannose, galactose, allose, altrose, talose, gulose, and idose; and ketohexose sugars include fructose, psicose, sorbose, and tagatose. Ketoheptose sugars include sedoheptulose. Most disaccharides are also reducing sugars. Other natural or synthetic stereoisomers or optical isomers of reducing sugars may also be useful as the reducing sugar component of the aqueous binder composition; for example, dextrose, which is one of the optical isomers of glucose. The reducing sugar component of the aqueous binder composition optionally may be substituted, for example with hydroxy, halo, alkyl, alkoxy, or other substituent groups; for example, dihydroxyacetone is a suitable keto substituted ketose. In addition, the reducing sugar can comprise a dehydrated form of a reducing mono- or di-saccharide, such as, hydroxymethyl furfural from dehyrdrogenated glucose.

The reducing sugars optionally may be substituted, for example, with hydroxy, halo, alkyl, alkoxy, carbonyl or other substituent groups.

Suitable reducing sugars may include, for example, fructose, glyceraldehydes, lactose, arabinose, maltose, glucose, dextrose and levulose. Further, a number of suitable reducing sugar sources may be used, such as corn syrup, high fructose corn syrup, and other fructose and dextrose equivalents.

In one embodiment, the reducing sugar component comprises a high dextrose content syrup, e.g. having a greater than 30 wt. % dextrose. In such syrups, the higher the dextrose content, the better; syrups with greater than 95%, dextrose content are commercially available, for example ADM 97/71 corn syrup, from Archer Daniels Midland Company (Decatur, Ill., USA).

Suitable primary di-amines and polyprimary polyamines may include, for example, alkyl diprimary or higher primary diamines, such as aliphatic primary diamines, such as aminoguanidine and its salts, e.g. aminoguanidine hydrochloride, putrescine, n-alkylenediamines, like ethylene diamine, hexamethylene diamines, and other alkylene di-amines; cycloaliphatic primary diamines, such as, for example, di-aminoethylpiperazine; primary amine functional amino acids, such as lysine and aminoglycine; and aromatic di-primary amines, such as, for example, bis-(aminomethyl)cyclohexane (bisAMC), m-xylenediamine (MXD); polyamine polymers of the desired molecular weight, such as polyethyleneimines, polyethylenimine containing copolymers and block copolymers having 10 wt. % or more of primary amine groups, (co)polymers of n-aminoalkyl (meth)acrylates, such as aminoethyl methacrylate, polyguanidines, and any other (co)polymer which has at least 10 wt. %, preferably 20 wt. %, of primary amine groups. One suitable cycloaliphatic primary diamine is PRIMENE™ MD from Dow Advanced Materials, formerly the Rohm and Haas Company (Philadelphia, Pa.).

Capping agents useful in the present invention may include, for example, titanates and zirconates such as organic titanates and zirconates sold by DuPont under the Trade name Tyzor, for example, water soluble Tyzors, such as, Tyzor™ LA, Tyzor™ 131, Tyzor™ 217, and Tyzor™ 218; dibutyltin dilaurate, other organo-tin salts, such as tin(IV) alkoxylates; mono- and di-carboxylate salts of aluminum or magnesium, and capping agents having the formula $MX_n$ wherein M is a metal, X is an organic acid, keto-acid, e.g, gluconic acid, reducing sugar or alkoxy (alkyl) group, and n is an integer of from 1 to 5, such as iron (II) (gluconate)$_2$. The capping agent may be chosen from, for example, the citrates, lactates, and gluconates of zinc, aluminum, zirconium, iron, magnesium, tin, titanium and boron; and their mixed metal salts; organo-tin compounds or salts; and titanates or zirconates of alcohols or carboxylic acids. A combination of capping agents may also be used. Preferably, the capping agent is water soluble, which means it has a solubility in water of greater than 1 gram per liter.

In another embodiment, the aqueous binder compositions have no added alkali and the pH of the aqueous binder is neutral to alkaline, e.g. 7.0 or higher or 7.4 or higher. Such compositions can be substantially free of strong acids (pKa of 3.0 or less), or polycarboxylic acids or their amine or ammonia salts.

In a further embodiment suitable for flexible binders, the aqueous composition further comprises an emulsion polymer. Suitable emulsion polymers may comprise acrylic emulsions having, as polymerized units up to 10 wt. % polymerized acid comonomers, preferably up to 3 wt. %, based on the total weight of copolymerized monomers, hydrophobic emulsion polymer comprising greater than 30% by weight, based on the weight of the emulsion polymer solids, ethylenically-unsaturated acrylic monomer containing a $C_2$ or greater alkyl group, and acrylic or styrene acrylic emulsion polymers.

Suitable acid comononers used to make the emulsion polymers may include, for example, methacrylic acid, acrylic acid, fumaric acid, maleic acid, itaconic acid, 2-methyl itaconic acid, a,b-methylene glutaric acid, monoalkyl maleates, and monoalkyl fumarates; ethylenically unsaturated anhydrides such as, for example, maleic anhydride, itaconic anhydride, acrylic anhydride, and methacrylic anhydride; and salts thereof. (Meth)acrylic acid is the preferred carboxy acid co-monomer.

The emulsion polymers may be present in the composition in an amount of 1% or more, or, 5% or more, or, up to 50%, or up to 30% by weight, based on the total binder solids.

In another embodiment, the aqueous binder compositions further comprise a reactive water proofing agent. Alkoxylated forms of reactive water proofing agent may include, for example, a $C_5$ to $C_{30}$ alk(en)yl monocarboxylate of a (poly) alkoxylated trihydric polyol, $C_5$ to $C_{30}$ alk(en)ylamine (poly) alkoxylate, $C_5$ to $C_{30}$ alk(en)yl diamine (poly)alkoxylate, $C_5$ to $C_{30}$ alk(en)ylamine (poly)alkoxylate containing an ether or thiother group in the alk(en)ylamine group, and mixtures thereof. Reactive water proofing agents may be used in amounts of up to 10 wt. %, based on the total binder solids.

In yet another embodiment, the aqueous binder compositions may further comprise additives, such as biocides; flame retardants, corrosion inhibitors such as, for example, triazole and phosphate compounds, tin oxalates, thioureas, oxalates, and chromates, dedusting agents such as, for example, mineral oils, anti-foaming agents such as dimethicones, silicon-polymer (polysiloxane) oils and ethoxylated nonionics. The biocides may, in one embodiment be applied as separate solution along with the aqueous binder compositions in use as part of binder application. Alternatively or in conjunction with applying biocide to the binder, biocide can be applied to the "white water" at the production site. This water can be used in processing the manufactured product and or making the applied binder solution.

In yet still another embodiment, the aqueous binder compositions can further comprise coupling agents such as silanes, particularly Silquest™ A-187 (manufactured by GE Silicones-OSi Specialties, located in Wilton Conn.); other amino silanes such as 3-aminopropyl dialkoxysilanes and 3-(2-aminoethyl)aminopropylsilanes; epoxy silanes such as glycidoxypropylsilanes, vinyl silanes and hydrophobic silanes.

To minimize the formaldehyde content of the aqueous composition, it is preferred, when preparing a polymer-containing formaldehyde-free curable composition, to use polymerization adjuncts and additives such as, for example, initiators, reducing agents, chain transfer agents, curing agents, biocides, surfactants, emulsifiers, coupling agents, anti-foaming agents, dust suppressing agents, fillers and the like, which are themselves formaldehyde free, or do not contain or generate formaldehyde during binder formation, application or cure.

The present invention provides methods of using the binder comprising applying the binder to a substrate and drying and/or curing. In drying (if applied in aqueous form) and curing the curable compositions, the duration, and temperature of heating, will affect the rate of drying, ease of processing or handling, and property development of the treated substrate. Suitable heat treatment temperatures may range 100° C. or more, and up to 400° C. The preferred treatment is substrate dependant. Thermally sensitive substrates such as cellulose fibers may be treated at 130 to 175° C. while thermally less sensitive composites may be treated at 150 to 200° C. and thermally resistant substrates such as mineral fibers may be treated at 220 to 300° C. for the desired times necessary to effect cure. Preferably, heat treatment temperatures range 150° C. or higher; such preferred heat treatment temperatures may range up to 225° C., or, more preferably, up to 200° C. or, up to 150° C. In the methods of use, the composition components need not all be pre-mixed prior to application of the binder to the substrate. For example, one or more components may be applied to a non-woven substrate, followed by application of the other binder components of this invention either in aqueous or dried form. After application, the binder can be cured by heating the coated non-woven to a sufficient temperature where it cures on the substrate.

The binder can be applied to the substrate, such as, for example, a web of fibers, by any suitable means including, for example, air or airless spraying, padding, saturating, roll coating, curtain coating, beater deposition, coagulation or dip and squeeze application, and the resultant saturated wet web laying on a supporting wire or screen is run over one or more vacuum boxes to remove enough binder to achieve the desired binder content in the product or treated substrate.

Drying and curing can be done in two or more distinct steps, if desired. For example, the curable composition can be first heated at temperatures and for times sufficient to at least partially dry, but not fully cure the composition, followed by heating for a second time, at higher temperatures and/or for longer periods of time, to effect curing. Such procedures, referred to as "B-staging," can be used to provide binder-treated nonwovens, for example, in roll form, which can be cured later, with or without forming or molding into a particular configuration, concurrent with the curing process.

Suitable substrates for binder application may include, for example, textiles, including cotton, linen, wool, and synthetic textiles from polyester, rayon, or nylon, and superabsorbent fibers; vegetable or cellulosic fibers, such as jute, sisal, flax, cotton and animal fibers; as well as heat resistant substrates, such as metal; plastics; synthetic fibers, e.g. polyester, rayon, poly(acrylonitrile) (PAN), poly(lactic acid) (PLA), poly(caprolactone) (PCL), aramid fibers, polyimide fibers, polyolefins and bi-component fiber comprising two or more fiber-forming polymers such as polypropylene and polyethylene terephthalate; mineral fibers, such as glass and mineral fibers, slag or stonewool, ceramic fibers, metal fibers, carbon fibers, and woven and non-woven fabrics made therefrom; and heat-sensitive substrates, such as wood, including, solid wood, wood particles, fibers, chips, flour, pulp, and flakes; paper and cardboard.

The binders of this invention may preferably be used to treat non-woven webs. "Non-woven web(s)" refers to any article or sheet-like form made from natural and/or synthetic fibers wherein the fibers are aligned in a random or semi-random order (i.e., not deliberately ordered) whether by mechanical means such as, for example, by entanglement caused by needle-punching, spunbonding, spunlace webs, meltblown webs, air-laid (dry laid) process, and by a wet-laid process; and/or by chemical means such as, for example, treatment with a polymeric binder; or by a combination thereof. Mineral fibers may be in the form of a web, i.e. blown into a forming chamber, sprayed with a binder, and deposited as a web on to a conveyer. Some ordering of fibers occurs during any web forming process (primarily in the machine direction). Included in the definition of non-woven webs suitable for use with this invention are porous films prepared by the action of chemical or mechanical processing (e.g., apertured films).

In a preferred embodiment, the binder treated product comprises non-wovens, such as, for example, a heat-resistant non-woven. Heat resistant non-wovens may also contain fibers which are not in themselves heat-resistant such as, for example, polyester fibers, rayon fibers, nylon fibers, and superabsorbent fibers, in so far as or in amounts such that they do not materially adversely affect the performance of the substrate.

Some suitable heat resistant non-wovens are used at temperatures higher than ambient temperature such as, for example, glass fiber-containing non-woven fabrics which are impregnated with a hot asphaltic composition pursuant to making roofing shingles or roll roofing material. When a non-woven fabric is contacted with a hot asphaltic composition at temperatures of from 150° C. to 250° C., the non-woven fabric can sag, shrink, or otherwise become distorted. Therefore, non-woven fabrics which incorporate a curable composition should substantially retain the properties contributed by the cured aqueous composition such as, for example, tensile strength. In addition, the cured composition should not substantially detract from essential non-woven fabric characteristics, as would be the case, for example, if the cured composition were too rigid or brittle or became sticky under processing conditions.

In another embodiment, this invention includes methods for treating a mat made from a web of fibers, and preferably transferred to a moving screen running through a binder application station where the aqueous binder of the invention is applied to the mat.

The binder add on level in substrate can range from 5 wt. % or more, or 10 wt. % or more, or up to 35 wt. percent of the finished substrate, preferably 12 wt. % or more, or, most preferably 15 to 25 wt. %, based on the total weight of the treated dry substrate, prior to cure.

Some suitable uses for the binder of the present invention include, for example, making non-structural composites and laminates for indoor furniture, trim and molding; and the wet end formation and dry end treating or coating of paper, paperboard and cardboard, such as filter media; and the making and treating of woven and non-woven fabrics, such as, for example, fiberglass and stonewool insulation batting, polyester and spunbonded roof shingles, underlayment and scrim, and gypsum board facings, and filter media, such as air and oil filters

EXAMPLES

The following examples serve to better illustrate the invention, which is not intended to be limited by the examples.

Example 1

Treated Glass Microfiber Filter Paper and Tensile Testing Thereof

Curable compositions were prepared by admixing components of each formulation to provide approximately 150 g of an aqueous binder at 15 wt. % solids.

A binder impregnated microfiber filter (Whatman International Inc., Maidstone, England, GF/A, catalog No. 1820 866), in 20.3 cm×25.4 cm sheets was prepared by mechanically drawing a filter sheet through a trough filled with 120 grams of a 15 wt. % pre-mixed aqueous binder that has been further mixed by agitation, then sandwiching the soaked sample between two cardboard sheets to absorb excess binder, and pressing between the two cardboard sheets in a Birch Bros. Padder (Waxham, N.C.), set at a pressure of 68.9476 kPa, and a speed 5 m/min. The resulting samples are dried @ 90° C. for 90 seconds in a Mathis Oven (Niederhasli/Zurich, Switzerland) that is vented or equipped with a devolatilizer.

The dried sheets were then cured at 190° C. for 60 seconds and 180 seconds in the same type of Mathis oven used to dry the samples. Post curing weight was determined to calculate binder add-on. "Add on" is the wt. % based on filter sheet weight of binder solids retained on the filter sheet after curing. All sheets had about 20 wt. % of binder add-on.

The cured sheets were cut into 2.56 cm (1 inch) (cross machine direction) by 10.24 cm (4 inch) (machine direction) test strips and tested for tensile strength in the machine direction in a Thwing-Albert Intelect 500 tensile tester (Phila., PA) The fixture gap was 5.12 cm (2 inches) and the pull rate was 2.56 cm (1 inches)/minute. Strips were tested either "as is" (dry tensile) or immediately after a 10 minutes soak in water at 85° C. (10 min wet tensile.) Tensile strengths were recorded as the peak force measured during parting. Data reported are averages of seven test strips.

TABLE 1

Aqueous Binder Formulations

| Example | A (g) | B (g) | NH$_3$ (g) | Water (g) | Add-on |
|---|---|---|---|---|---|
| 1 | Dextrose 20.0 | Lysine 4.43 | 1.84 | 124.87 | 21.3/19.8 |
| 2 | Dextrose 20.0 | Lysine 8.87 | 3.68 | 146.76 | 20.4/20.9 |
| 3 Comp | Dextrose 20.0 | Glycine 2.28 | 1.84 | 115.60 | 23.0/19.8 |
| 4 Comp | Dextrose 20.0 | Ethanolamine 1.85 | 0 | 115.6 | 19.0/14.4 |
| 5 Comp | Dextrose 20.0 | Arginine 5.28 | 1.84 | 133.96 | 20.4/18.3 |
| 6 | Dextrose 20.0 | bisAMC 4.31 | 1.84 | 127.26 | 20.2/17.6 |
| 7 Comp | Sucrose 18.2 | Lysine 9.33 | 3.87 | 152.12 | 20.7/18.5 |

TABLE 1-continued

Aqueous Binder Formulations

| Example | A (g) | B (g) | NH$_3$ (g) | Water (g) | Add-on |
|---|---|---|---|---|---|
| 8 | Dihydroxy-acetone 18.2 | Lysine 8.86 | 3.68 | 148.99 | 20.4/18.8 |
| 9 Comp | Fructose 18.2 | Piperazine 5.23 | 0.0 | 132.65 | 15/8.0 |
| 10 | Dextrose 20.0 | MXD 8.23 | 0.0 | 147.83 | 18.9/20.8 |
| 11 Comp | Dextrose 20.0 | Cysteine 7.65 | 0.0 | 144.66 | 19.5/17.1 |
| 12[1] | Dextrose 20.0 | Lysine 8.86 | 0.0 | 167.64 | 17.4/17.4 |
| 13 | Dextrose 20.0 | poly (ethylenimine)[5] 10.00 | 0.0 | 185.16 | 20.4/19.3 |
| 14[2] | Dextrose 20.0 | Lysine 8.87 | 0.0 | 186.22 | 20.8/19.9 |
| 15[3] | Dextrose 20.0 | Lysine 8.86 | 0.0 | 185.20 | 20.3/20.3 |
| 16[4] Comp | Dextrose 20.0 | Fish Gelatin 10.09 | 0.0 | 214.28 | 21.1/19.5 |
| 17[2] | Dextrose 20.0 | Lysine 8.87 | 0.0 | 180.07 | 19.3/20.8 |

[1]Tyzor LA (DuPont) 50% solution (DuPont, Wilmington, DE) titanium complex of lactic acid
[2]3-aminopropyl-trimethoxysilane, 1.44 g
[3]Aluminum I-lactate 1.44 g.
[4]Norland Dried Fish Gelatin (lot# 8098), mix 30 minutes.
[5]Poly(ethylenimine): MW$_w$ ~1800; amine equivalent weight is ~175.

The following ingredients were used in the aqueous Binder Formulations:

Dextrose was obtained from Fisher Scientific (Pittsburgh, Pa.) as dextrose hydrate.

Sucrose was obtained from Aldrich Chemical (Milwaukee, Wis.) as an anhydrous solid.

bisAMC: 1,3-bis(aminomethyl)cyclohexane (CAS#2579-20-6)

MXD: m-xylenediamine (CAS#1477-50-0)

PEI: polyethylenimine as a 50% wt. aq. sol'n of a polymer with a Mn ca. 1,800 (GPC) having roughly 25 wt. % of groups as primary ethylenamine (Aldrich catalog no. 408700-250 ml.)

Fish gelatin protein has a content of >1000 amino acids and roughly 3.5 wt. % of primary amine groups (1.3% methionine; and ~3.5% lysine).

Lysine and other amino acids were added dry to the formulation.

Ammonia is used as a 28 wt. % aqueous solution.

TABLE 2

Test Results-Tensile Strength

| Example | Dry 60 sec | Hot Wet 60 sec | Dry 180 sec | Hot Wet 180 sec |
|---|---|---|---|---|
| 1 | 12.4 | 3.0 | 13.0 | 7.1 |
| 2 | 14.7 | 5.9 | 14.2 | 7.3 |
| 3 Comp | 10.4 | 0.0 | 10.0 | 0.7 |
| 4 Comp | 2.4 | 0.0 | 7.9 | 0.0 |
| 5 Comp | 8.5 | 0.0 | 10.4 | 0.6 |
| 6 | 12.7 | 7.0 | 13.3 | 7.9 |
| 7 Comp | 10.0 | 0.0 | 11.0 | 0.0 |
| 8 | 12.9 | 4.9 | 13.3 | 5.9 |
| 9 Comp | 1.3 | 0.0 | 6.8 | 0.0 |
| 10 | 10.8 | 10.1 | 13.0 | 11.8 |
| 11 Comp | 9.0 | 0.0 | 9.0 | 0.0 |
| 12 | 10.9 | 7.4 | 10.2 | 7.5 |
| 13 | 14.7 | 9.0 | 14.0 | 9.4 |
| 14 | 14.7 | 11.2 | 14.2 | 11.3 |
| 15 | 14.7 | 8.3 | 14.8 | 9.0 |
| 16 Comp | 13.0 | 2.5 | 15.9 | 4.0 |
| 17 | 14.2 | 9.3 | 14.8 | 12.3 |

As shown in Table 2, above, aqueous binders of reducing sugars with roughly the same (~50) mol. % of diprimary diamines, such as lysine in Examples 2 and 8, a 1,3-bis (aminomethyl)cyclohexane (bisAMC) in Example 6, and an m-xylenediamine (MXD) in Example 10 provided treated filter paper nonwovens having especially good hot wet tensile strength with or without NH$_3$. As shown in Example 12, the hot wet tensile strength can be further improved by addition of a capping agent, such as a titanium, for example, lactate complex. In addition, Table 2 shows that the inventive aqueous binders successfully provided for a rapid, 60 second cure at 190° C. In contrast, the amino acids glycine, arginine and cysteine which have only one free primary amine and as shown, respectively, in Examples 3, 5, and 11 provided binders exhibiting zero or little hot wet tensile strength. As shown in Example 9, above, a disecondary diamine, piperazine, provided no hot wet tensile strength. In addition, as shown in Example 4, the primary monoamine ethanolamine provided a binder with no hot wet tensile strength. As shown in Example 7 a binder of lysine and a non-reducing sugar, sucrose, gave no hot wet tensile strength.

Also, shown in Table 2, above, a binder of polyethylenimine with dextrose gave very good tensile strength results in Example 13. Binders of Examples 14, 15, and 17 all gave very good tensile strength results with reducing sugars, lysine and capping agents (Example 15) or silanes (Examples 14 and 17) and showed further improvement over the same binder without the capping agent or silane. Meanwhile, fish gelatin in Example 16 gave poor hot wet tensile strength results and did not contain the desired amount of primary amine.

We claim:

1. An aqueous binder composition comprising one or more diprimary diamine, and one or more reducing sugar chosen from a reducing monosaccharide, a reducing disaccharide, a stereoisomer thereof, an optical isomer thereof, a hydroxy, halo, alkyl, alkoxy or carbonyl substituted reducing monosaccharide, a hydroxy, halo, alkyl, alkoxy or carbonyl substituted reducing disaccharide, a dehydrated reducing monosaccharide, and a dehydrated reducing disaccharide, wherein the number of equivalents of primary amine relative to the number of equivalents of carbonyl groups in the reducing sugar ranges from 0.4:1 to 2:1, wherein the one or more diprimary diamine is chosen from aliphatic primary diamines, aminoguanidine, aminoguanidine salts, alkylene diamines; cycloaliphatic primary diamines, and aromatic di-primary amines.

* * * * *